June 29, 1965 A. W. CHENEY 3,192,362
INSTRUCTION COUNTER WITH SEQUENTIAL ADDRESS CHECKING MEANS
Filed Aug. 22, 1961 6 Sheets-Sheet 1

INVENTOR
ADELBERT W. CHENEY
BY Griffin and Stokes
ATTORNEYS

INSTRUCTION COUNTER WITH SEQUENTIAL ADDRESS CHECKING MEANS

Filed Aug. 22, 1961

June 29, 1965 A. W. CHENEY 3,192,362

INSTRUCTION COUNTER WITH SEQUENTIAL ADDRESS CHECKING MEANS

Filed Aug. 22, 1961 6 Sheets-Sheet 3

June 29, 1965 A. W. CHENEY 3,192,362

INSTRUCTION COUNTER WITH SEQUENTIAL ADDRESS CHECKING MEANS

Filed Aug. 22, 1961 6 Sheets-Sheet 6

United States Patent Office 3,192,362
Patented June 29, 1965

3,192,362
INSTRUCTION COUNTER WITH SEQUENTIAL ADDRESS CHECKING MEANS

Adelbert W. Cheney, St. Paul, Minn., assignor to Sperry Rand Corporation, New York, N.Y., a corporation of Delaware Filed Aug. 22, 1961, Ser. No. 133,168
27 Claims. (Cl. 235—153)

The present invention relates to means for checking counters of the type used in computers and data processing machines. More particularly, the present invention provides means for checking the computations performed by an instruction counter to insure that the instruction addresses computed by the counter are the correct addresses. This invention provides means for indicating that an error has occurred if the counter is instructed to compute sequential addresses and the address computed is not greater than the previous address by value of one or, if the counter is instructed to skip one address and the address computed is not greater than the previous address by a value of two.

It is well known to those skilled in the art that computers and data processing devices operate under the control of instruction words. In many of the prior art computers these instructions are stored in a memory device at sequential locations or addresses and are obtained from memory one at a time to control the operations of the computer. An instruction counter is used for this purpose, the output signals of the counter being applied to a memory address register to thereby control the memory selection circuits to select a particular address. The instruction word stored at this address is then read out of the memory to an instruction register and used to control the computer operation. While the computer is executing the operation specified by the instruction word, the value standing in the instruction counter is incremented by 1 so that when the operation specified by the present instruction is completed the instruction stored at the next memory address will have been read out of the memory and ready for entry into the instruction register.

Many computers of the prior art utilize what is known as a SKIP instruction. This instruction causes the computer to test for a given condition. If the condition is met then the address of the SKIP instruction standing in the instruction counter is incremented by two to thereby cause the next instruction to be skipped. If the condition is not met then the instruction counter is incremented by one and the next instruction taken from the memory address which is one greater than the address of the SKIP instruction.

There is a third mode of operation involving instruction counters. A JUMP instruction contains the address of the next instruction to be performed. The JUMP instruction blocks the instruction counter to prevent it from controlling the memory selection circuits and at the same time causes the address contained in the JUMP instruction to select the next instruction from memory. The address contained in the JUMP instruction is also entered into the instruction counter and incremented by one so that it may select from memory the instruction to be executed after the instruction stored at the address jumped to has been executed.

It is obvious therefore that an instruction counter may operate in many modes thereby making difficult the process of checking its operation. Heretofore, the checking process has been accomplished by using duplicate counters and comparing the results, or by performing computations on modulo N check digits assigned to each value in the computation and comparing the result with the check digit of the result of the computations on the value in the instruction counter. Both systems require a large number of components for the checking process. The components are expensive and their addition to the system introduces additional possibilities of equipment malfunction.

Therefore, a general object of this invention is to provide means for checking the operations of a counter, said means being less expensive and requiring fewer components than checking devices heretofore known.

An object of this invention is to provide an improved error detecting device for detecting errors in the operation of a counter whether said counter is incremented by one or incremented by two.

An object of the present invention is to provide means responsive to the parity indications and the configuration of binary ones and zeros in two numbers for indicating that said numbers are consecutive numbers.

An object of the present invention is to provide means responsive to the parity indication and the configuration of binary ones and zeros in two numbers for indicating that said numbers differ by a value of two.

A feature of the present invention is the provision of first means for storing a first value and an indication of its parity, second means for storing a second value representing the result of a computation on said first value, and means responsive to said first and said second means and an indication of the desired computation for indicating that the result obtained is not the correct result of the desired computation.

A further feature of the present invention is the provision of a counter for computing a sequence of numbers in response to a sequence of commands, means for generating a sequence of parity indications corresponding to the parities of said numbers, means for comparing each number in said sequence with the number immediately preceding it in said sequence, and error detecting means responsive to said parity indications, said comparing means, and said commands for indicating that an error has occurred in computing said sequence of numbers.

Another feature of this invention is the provision of an error detecting circuit for an instruction counter of the type having first and second registers and an address counter responsive to a command and the previous address contained in said first register for computing and entering into said second register a present address. The error detecting device comprises a first circuit for comparing each even stage of the first register with the corresponding even stage of the second register, a second circuit for comparing the parity of the previous address standing in the first register with the parity of the present address standing in the second register, and a third circuit responsive to said first and second circuits and the command applied to the address counter for indicating that an error has occurred in computing the present address.

Other objects of the invention and its mode of operation will become apparent upon consideration of the following description taken in conjunction with the accompanying drawings in which.

Figures 1, 3, 6:
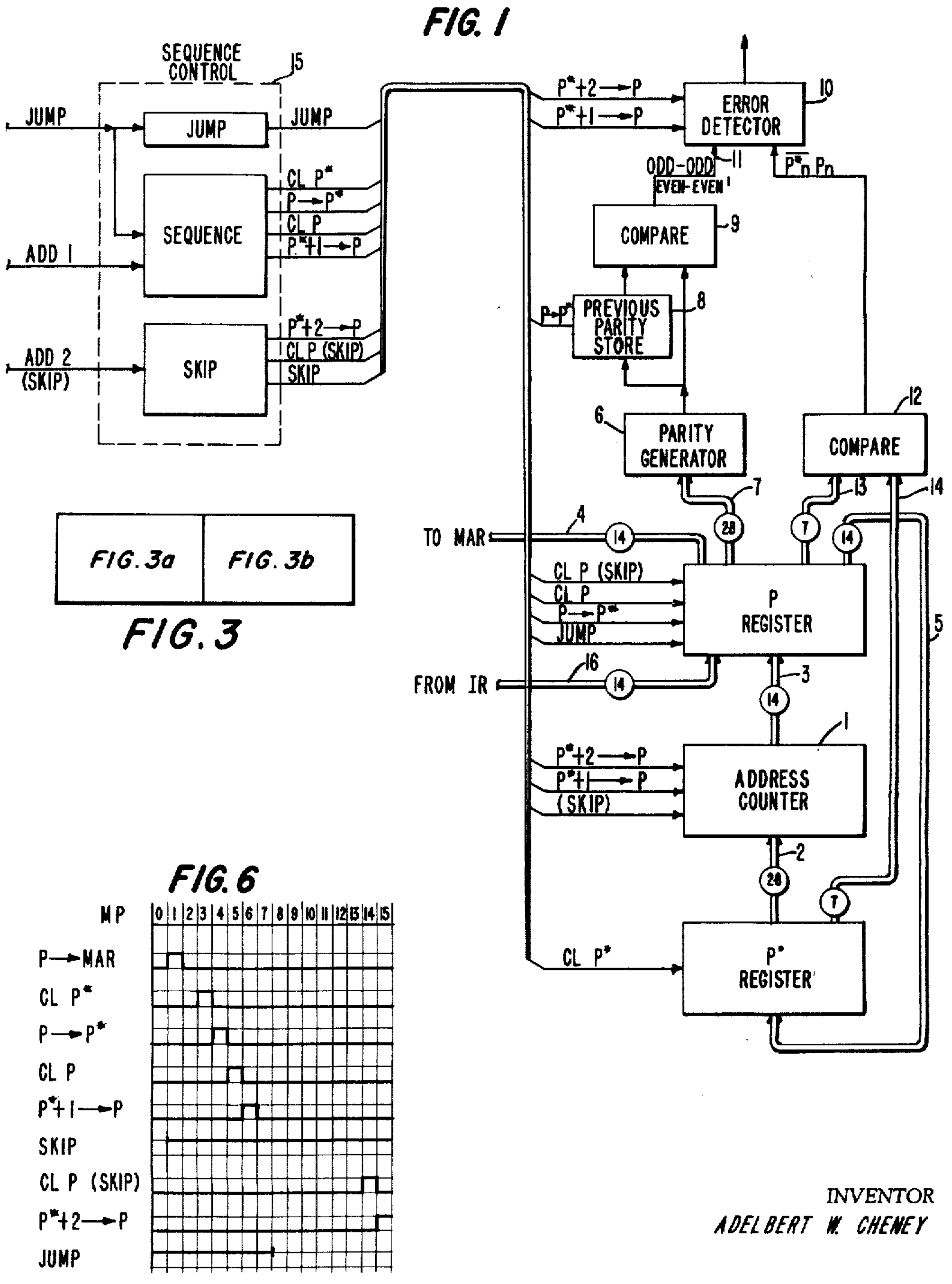
FIGURE 1 is a block diagram of the present invention.
Figure 3A:
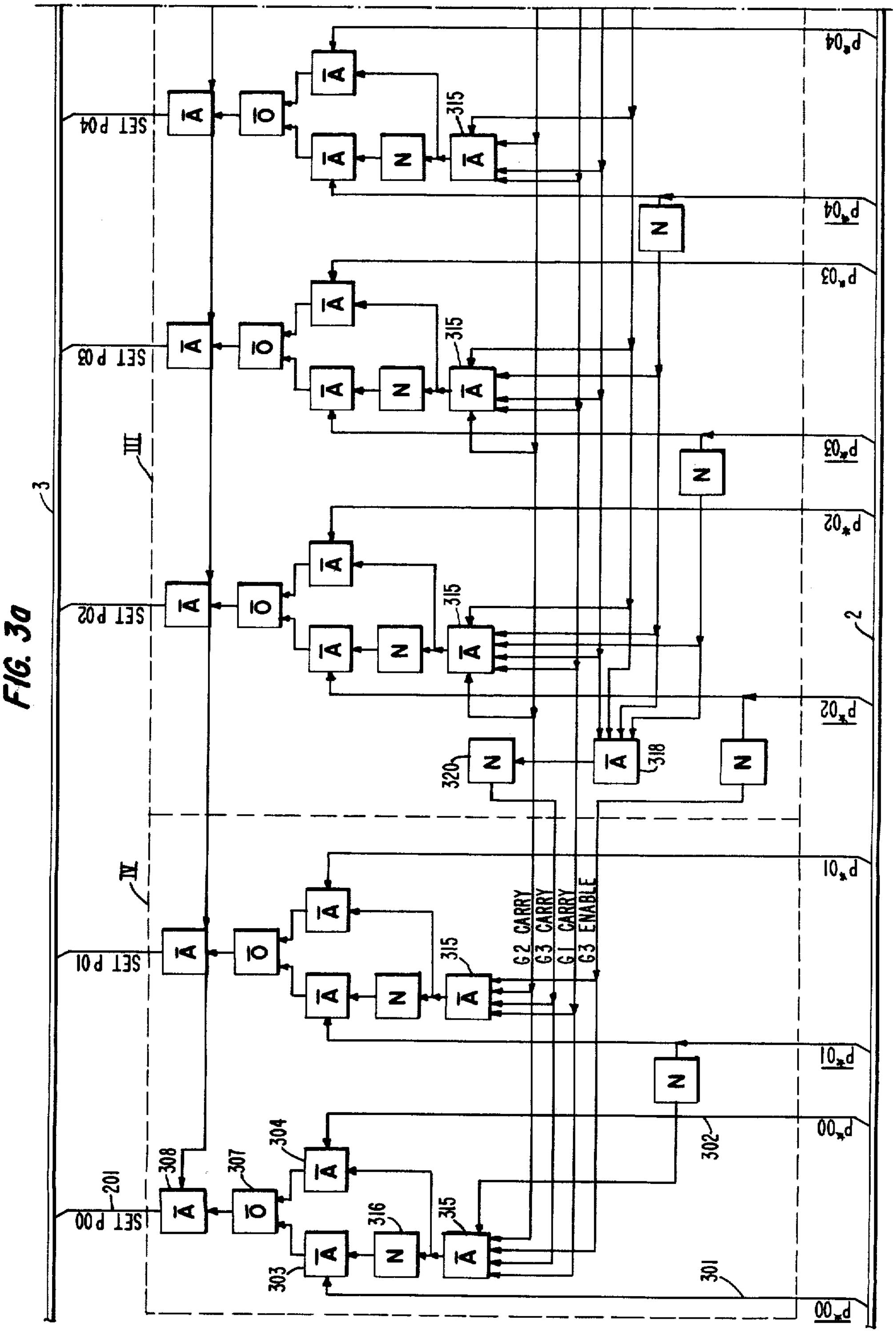
Figure 3B:
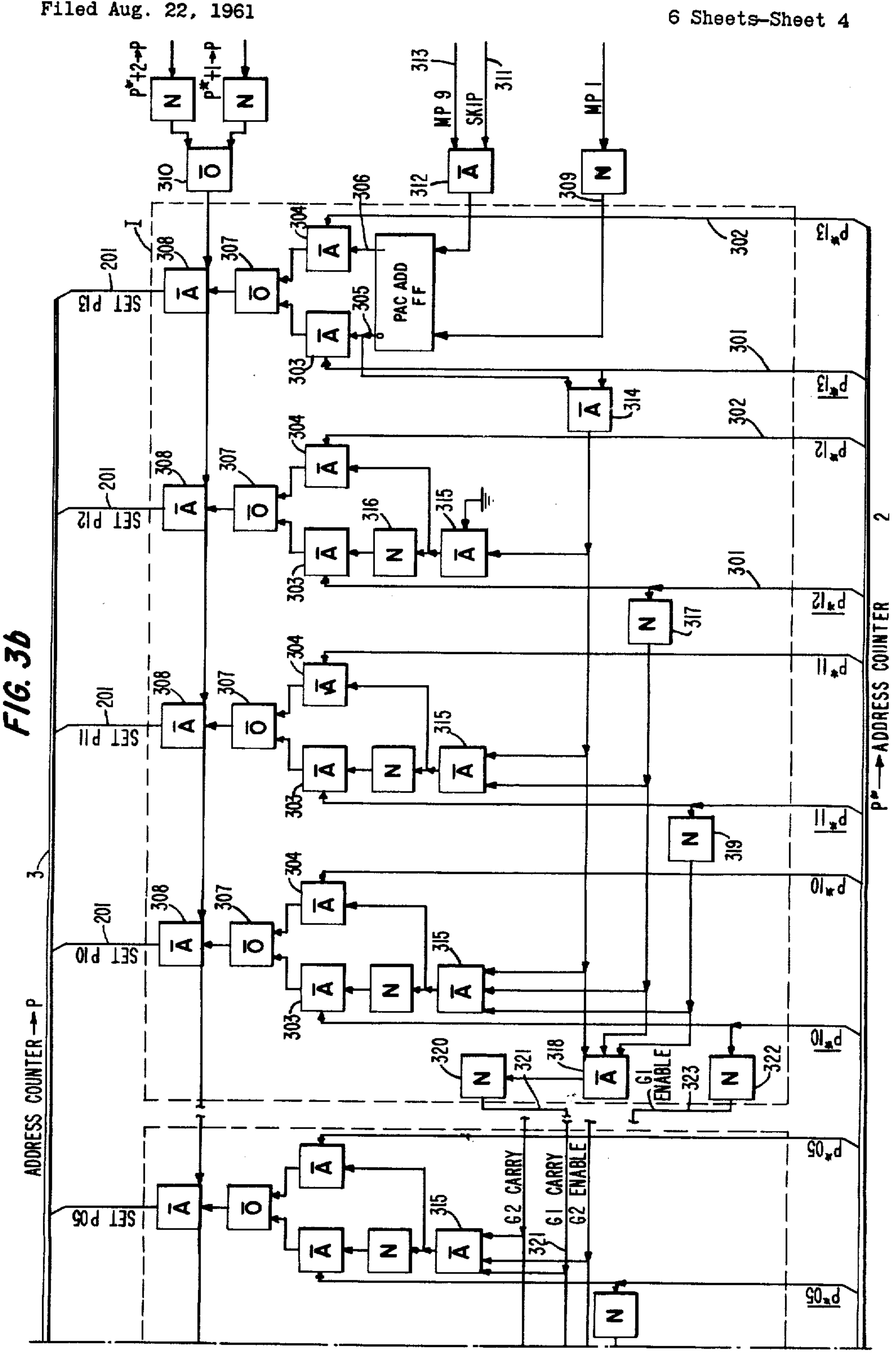
Figure 4:
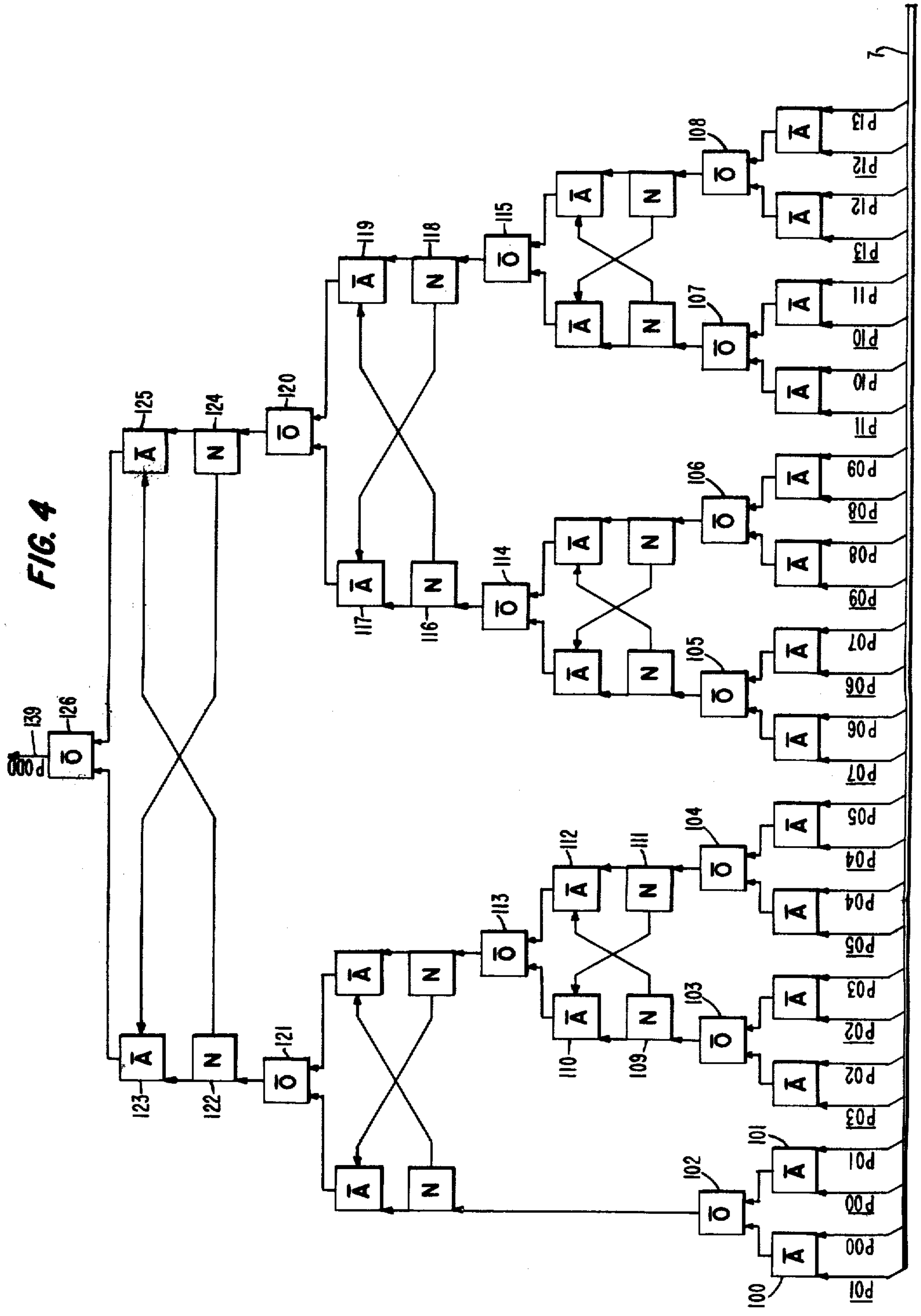
Figure 5:
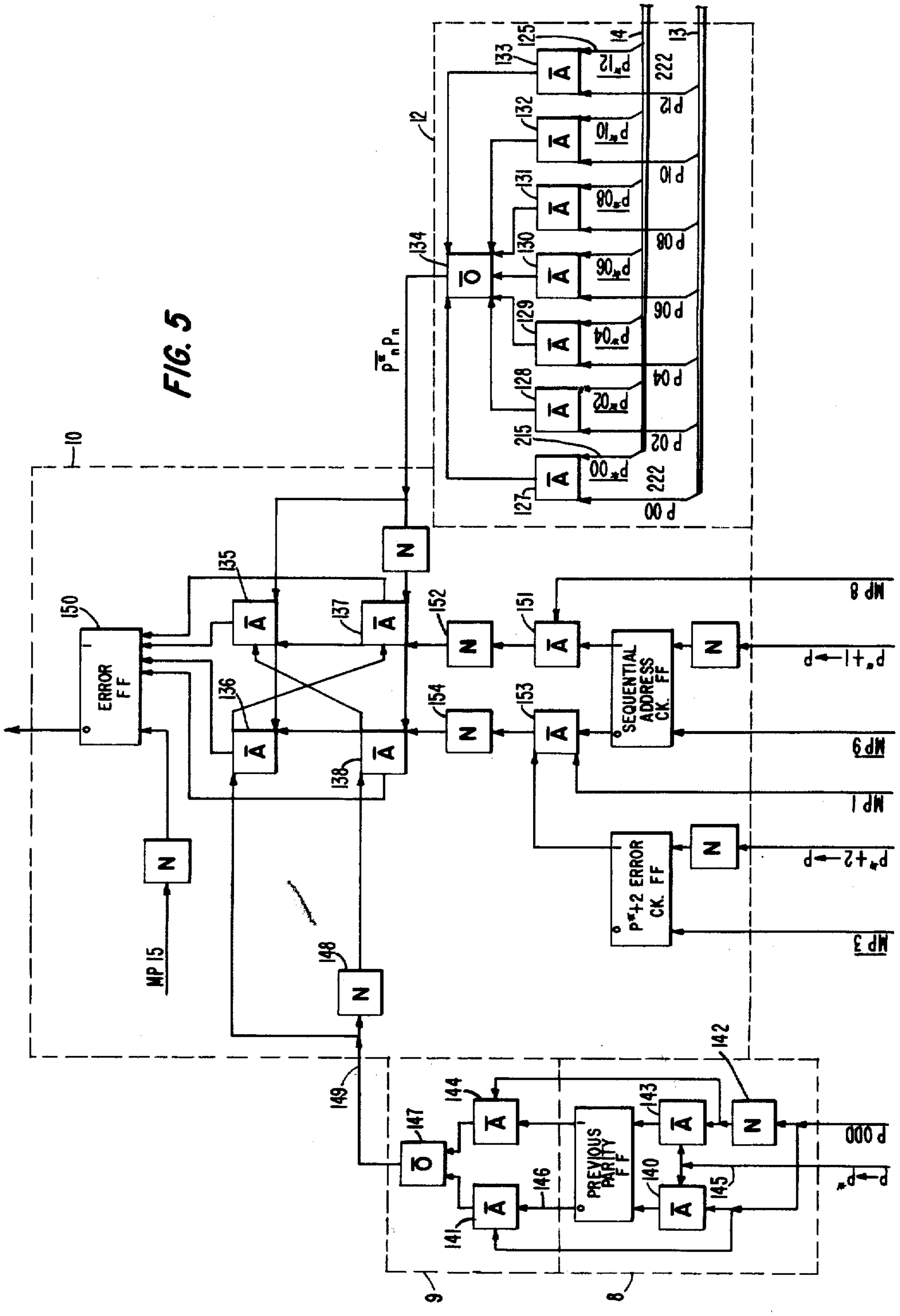

FIGURES 3*a* and 3*b* when arranged as shown in FIGURE 3 show the address counter;

FIGURE 4 shows the parity generator;

FIGURE 5 shows the previous parity storage circuit, the comparing circuits, and error detector; and, FIGURE 6 is a timing diagram illustrating the sequence in which pulses occur during operation of the present invention.

The method by which the present invention accomplishes checking of an instruction counter may be better understood from a consideration of Table I which shows the parity of decimal addresses 0 through 12 as well as the binary equivalent of the decimal values. The present address is designated P and the previous address P*, it being understood that the previous address P* on one cycle is modified and becomes the present address P on the next succeeding cycle where P may be $P^*+1$ or $P^*+2$. Note the random sequence in which odd and even parities occur. Because of the random sequence the checking operation cannot be performed by a parity check alone. However, inspection of Table I does show a pattern which involves not only the parity of the previous address and the parity of the present address, but also the binary configuration of the previous address as compared to the binary configuration of the present address.

TABLE I

| Parity | P or P* | | | | Decimal address |
|---|---|---|---|---|---|
| | 10 | 11 | 12 | 13 | |
| Even | 0 | 0 | 0 | 0 | 0 |
| Odd | 0 | 0 | 0 | 1 | 1 |
| Odd | 0 | 0 | 1 | 0 | 2 |
| Even | 0 | 0 | 1 | 1 | 3 |
| Odd | 0 | 1 | 0 | 0 | 4 |
| Even | 0 | 1 | 0 | 1 | 5 |
| Even | 0 | 1 | 1 | 0 | 6 |
| Odd | 0 | 1 | 1 | 1 | 7 |
| Odd | 1 | 0 | 0 | 0 | 8 |
| Even | 1 | 0 | 0 | 1 | 9 |
| Even | 1 | 0 | 1 | 0 | 10 |
| Odd | 1 | 0 | 1 | 1 | 11 |
| Even | 1 | 1 | 0 | 0 | 12 |

Note for example that if the parity of the previous address is odd and the parity of the current address is also odd, then at least one pair of corresponding even bits of P* and P are 0 and 1 respectively if the addresses are P* and $P^*+1$, but there are no corresponding even bits of P* and P which are 0 and 1 respectively if the addresses are P* and $P^*+2$. The table also shows that if the previous address has an even parity and the present address also has an even parity, then at least one pair of corresponding even bits P* and P are 0 and 1 respectively if the addresses are P* and $P^*+1$ while there are no corresponding even bits of P* and P which are 0 and 1 respectively if the addresses are P* and $P^*+2$.

If the parity of the previous address is odd and the parity of the present address is even, then there are no corresponding even bits of P* and P which are 0 and 1 respectively if the addresses are P* and $P^*+1$ while at least one pair of corresponding even bits of P* and P are 0 and 1 respectively if the addresses are P* and $P^*+2$. Finally, the table shows that if the parity of the previous address is even and the parity of the present address is odd, then there are no corresponding even bits of P* and P which are 0 and 1 respectively if the addresses are P* and $P^*+1$ while at least one pair of corresponding even bits of P* and P are 0 and 1 respectively if the addresses are P* and $P^*+2$. A tabulation of these conditions is shown in Table II.

TABLE II

*Conditions producing errors during address computation*

| Previous Parity | Present Parity | $P^*_n=0$ and $P_n=1$ (n is 0, 2, 4, 6, 8, 10 or 12) | $P^*+1$ Error | $P^*+2$ Error |
|---|---|---|---|---|
| Odd | Odd | Yes | No | Yes |
| Odd | Odd | No | Yes | No |
| Even | Even | Yes | No | Yes |
| Even | Even | No | Yes | No |
| Odd | Even | Yes | Yes | No |
| Odd | Even | No | No | Yes |
| Even | Odd | Yes | Yes | No |
| Even | Odd | No | No | Yes |

Referring now to FIGURE 1, the instruction counter comprises a first register P*, a second register P, and an address counter 1. The P and P* registers each contains fourteen binary stages for storing fourteen bit binary numbers representing memory addresses. The address counter also comprises fourteen binary stages and in computing sequential address it normally presents at its output an address which is one greater than the address applied to it over buss 2 from the P* register. Signals from both the zero and one output of each stage of P* are continually applied to the address counter over the 28 leads contained in buss 2. The command $P^*+1$ to P conditions output gates on the ones side of each stage of the address counter thus causing the address $P^*+1$ to be entered into the P register over the fourteen leads of buss 3.

If the command SKIP is applied to the address counter, circuits are set in the counter such that the output signals from the counter represent an address which is two greater than the address standing in P*. This address is entered into the P register over buss 3 in response to the command $P^*+2$ to P which conditions output gates on the ones side of each stage of the counter.

The address standing in P may be transferred by way of buss 4 to a memory address register (not shown) to thereby effect the selection of an instruction word from a memory.

After the address is transferred from P to the memory address register, a command P to P* causes the address standing in P to be transferred over buss 5 to P*. The address counter may now add either 1 or 2 to this address to obtain the address of the next instruction.

The parity generator 6 continuously generates the parity of the address standing in the P register. The signals representing the address in P are continuously applied to the parity generator over buss 7 and the output of the parity generator is continuously applied to the circuit 8 which stores the parity of the previous address and the circuit 9 which compares the parity of the previous address with the parity of the present address. The output of comparing circuit 9 is applied to error detector 10 over the lead 11. As will be shown later, the signal on lead 11 indicates whether or not the parity of the present address standing in the P register is the same as the parity of the previous address held in the P register.

The comparing circuit 12 compares the output from each even stage of the P register with the output from the corresponding even stage of the P* register. This comparing circuit receives the output from the ones side of each even stage of P over the buss 13 and the output from the zero side of each even stage of P* over the buss 14. If at least one even stage of P contains a binary 1 and the corresponding stage of P* contains a binary 0, the comparing circuit produces an output signal which is applied to the error detector to indicate this condition.

FIGURE 6 is a timing diagram illustrating the sequence in which commands are applied to the circuit shown in FIGURE 1. These commands are generated by the sequence control element 15 which may, for instance, be the control element of a computer or data processing device. Such control elements are well known in the art and form no part of the present invention; hence the details thereof are not shown. One such control element may, for example, generate the signals CLEAR P*, P to P*, CLEAR P, and $P^*+1$ to P on each cycle in response to the signal ADD 1.

If a SKIP instruction is being executed and the SKIP condition is met, the control element responds to the signal ADD 2 (SKIP) and generates the commands $P^*+2$ to P and CLEAR P (SKIP).

If the signal JUMP is received by the sequence control element it responds by generating the command JUMP in addition to the commands it generates in response to the ADD 1 signal.

One cycle of operation of the present invention encompasses sixteeen time intervals determined by timing pulses from a main pulse generator and designated MP0 through MP15. The first operation in each ADD 1 cycle is to transfer the present address from the P register to the memory address register over buss 4 at time MP1 so that when the instruction currently being executed is completed the instruction stored at this address will have been read out of the memory and ready for entry into the instruction register. At time MP3, the command CLEAR P* clears the P* register in preparation for receiving the present address from the P register. At MP4 the command P to P* opens the gates on the output of the P register thereby permitting the present address to be transferred over buss 5 to P*. Since this address has now served the purpose for which it was generated, it may now be considered the previous address. The command P to P* also conditions the previous parity storage circuit which stores the parity of the address transferred from P to P*. At MP5, the command CLEAR P clears the P register in preparation for receiving the next present address. The command $P^*+1$ to P occurs at time MP6 and transfers to the P register an address which is one greater than the previous address it contained and which is now contained in the P* register. At MP1 of the next cycle this address may be transferred from P to the memory address register to select another instruction and the cycle described above repeated.

At time MP8 gates in the error detector 10 are sampled by a clock pulse (not shown) and an output signal is produced by the error detector at this time if any one of the error conditions shown in Table II is present.

If a JUMP signal is applied to sequence control element 15 it generates the commands CLEAR P*, P to P*, CLEAR P, and $P^*+1$ to P in the sequence described above. In addition, sequence control 15 emits the JUMP command which is applied to the P register. In a manner to be subsequently described, the JUMP command clears P at time MP2 and at time MP3 permits the address in the instruction register to be transferred into P. At MP4 the JUMP address is transferred to P* and at MP5 the P register is cleared. At MP6 the command $P^*+1$ to P causes the address counter to add one to the JUMP address and enter the new address into P where it may be subsequently used to select the next address.

The computation of the JUMP address plus one is checked in the same manner as is done in response to the ADD 1 signal.

The ADD 2 or SKIP instruction causes sequence control 15 to produce the commands SKIP, $P^*+2$ to P and CLEAR P. These are the only commands issued by sequence control during the computation of an address which is two greater than the previous address. The computation is as follows.

The previous address is contained in P* since the command CLEAR P* is not generated by sequence control. The command SKIP sets circuits to cause the address counter to present at its output an address which is two greater than the address in P*. At MP14 sequence control emits the command CLEAR P to clear the P register and at MP15 the address generated by the address counter is transferred to P. This address is then available to select the next instruction.

As will be shown, the gates in the error detector are sampled by a clock pulse at MP1 and an error signal is produced if any one of the conditions listed in Table II is present thereby indicating that the present address is not greater than the previous address by a value of two as required by the signal ADD 2.

Before proceeding with a description of the details of the circuits shown in FIGURES 2 through 5 it should be noted that the present invention comprises four types of logical elements herein referred to as NOT (N), NOR ($\overline{O}$), gate ($\overline{A}$) and flip-flop (FF).

A NOT circuit is an inverter having a single input. A negative input signal causes a positive output signal and a positive input signal causes a negative output signal.

A NOR circuit produces a positive output signal if at least one input receives a negative signal.

A gate as used herein refers to a device for performing the negative AND function. All inputs to a gate must be positive in order for it to produce a negative output signal. If any input is negative then the output is positive.

A flip-flop is a bistable storage element having set and reset inputs and set and reset outputs. A negative signal applied to the set input produces a positive signal at the set output and a negative signal applied to the reset input produces a positive signal at the reset output.

Many devices of the above types are described in the prior art and are not shown herein. Further, in the following description use is made of the terms positive and negative when referring to voltages. It should be understood that these terms as used are relative to each other and do not necessarily refer to voltages which are positive and negative with respect to zero.

Figure 2:
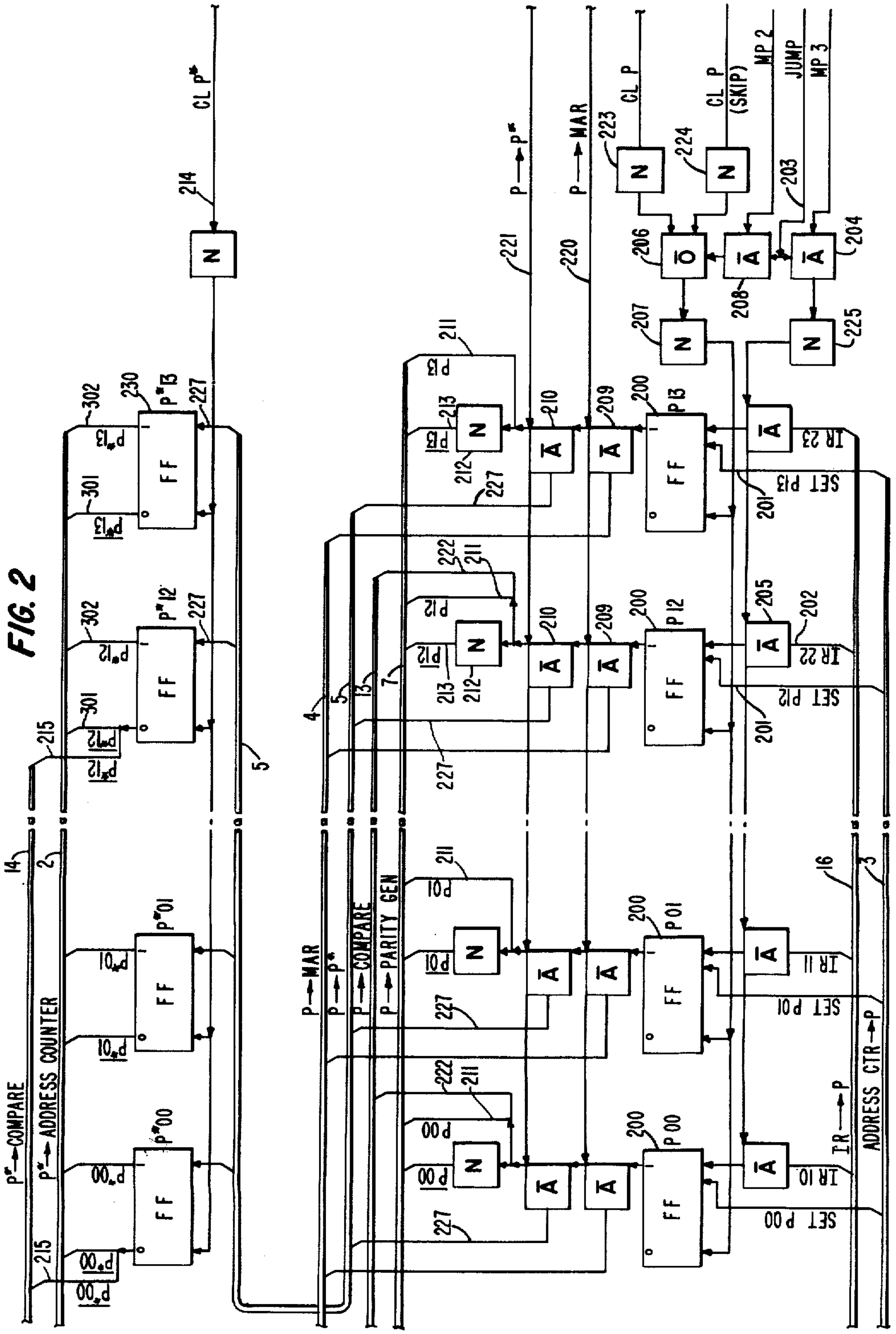
FIGURE 2 shows the previous address register and the present address register.

The P and P* registers are shown in FIGURE 2. The P register comprises 14 stages designated P00 through P13. Only the first two and last two stages of the register have been shown since all even number stages are identical and all odd numbered stages are identical.

Considering the low order stage P13 as an example, each stage comprises a bistable flip-flop 200. The flip-flops 200 are always cleared immediately before an address is read into the register. The command CLEAR P occurs at MP5 of an ADD 1 cycle and the command CLEAR P (SKIP) occurs at MP14 of an ADD 2 cycle. The positive signal CLEAR P is inverted at 223 and inverted again at NOR 206 before being applied to NOT 207. The positive signal CLEAR P (SKIP) is inverted at 224 and inverted again at NOR 206 before being applied to NOT 207. The negative output signal of NOT 207 is applied to the reset side of each flip-flop 200.

It is also necessary to clear the P register on a JUMP operation. The command JUMP is applied to gate 208 which is sampled at MP2 by a clock pulse. The negative output signal from gate 208 passes through NOR 206 and NOT 207 to reset the flip-flops 200.

An address is entered into the P register during the time period following the one in which it is reset. During an ADD 1 cycle, the address appears on leads 201 at time MP6 and during an ADD 2 cycle the address appears on the leads 201 at time MP15. The leads 201 are connected by way of buss 3 to gates on the output of the address counter. As will be shown, the commands applied to these gates determine the time at which an address appears on the leads 201.

During a JUMP instruction, the address being jumped to is transferred to P from the instruction register at time MP3. The JUMP command is applied to gate 204 which is sampled by a clock pulse at MP3. The negative output of 204 is inverted at 225 and applied to gates 205. If any lead 202 is positive thereby indicating a binary 1 in a given stage of the Instruction Register, the corresponding gate 205 produces a negative output signal to set the associated flip-flop 200.

If the flip-flop 200 is set, a positive output off the ones side conditions one input of gates 209 and 210. If it is desired to transfer the address in the P register to the Memory Address Register to effect the selection of an instruction, a command P to MAR appears on lead 220 at time MP1. This command conditions a second input of each gate 209 thereby transferring the address in P to the buss 4.

The address standing in P is transferred to P* at MP4 of each cycle in which it is desired to add one to the previous address. The command P to P* appears on lead 221 at this time thereby conditioning one input of each of the gates 210 and each of these gates produces a negative output signal if its corresponding flip-flop 200 contains a binary one. A negative output from gate 210 sets the corresponding stage of the P* register over the lead 227.

The output of the P register is continuously applied to the parity generator 6 over buss 7. If a flip-flop 200 contains a binary one, the lead 211 is positive and the lead 213 is negative. If flip-flop 200 contains a binary zero, then lead 211 is negative and lead 213 is positive.

The even order stages of the P register contain an additional output lead 222 not found in the odd stages. These leads are taken off the ones side of the flip-flop 200 in each even stage and are connected to the comparing circuit 12 by way of buss 13.

The P* register also comprises 14 stages each having a flip-flop 230 which may be set in response to a negative output signal from gate 210 of the P register. A CLEAR P* command emitted by the control element 15 during an ADD 1 cycle resets each of the flip-flops in the P* register. Each stage has an output from both the zero side and the one side of the flip-flop and the signals appearing on these leads are continuously applied to the address counter over leads 301 and 302 in buss 2. In addition, each of the even stages of the P* register has an additional output lead 215 which comes off the reset side of the flip-flop. These leads are connected to the compare unit 12 over buss 14.

The address counter shown in FIGURE 3 comprises fourteen stages designated 00 through 13, stage 00 being the high order stage. Stage 13 includes the Program Address Counter ADD FF for controlling the addition of one or two to the value applied to the counter from the P* register. Each stage of the counter has a first input lead 301 connected to the zero output of the flip-flop in the corresponding stage of the P* register and a second input lead 302 connected to the ones output of the flip-flop in the corresponding stage of the P* register. The output from the P* register is continuously applied to the address counter over the leads 301 and 302. This value is increased by 1 or 2 in the counter depending upon whether it is desired to compute the next address in sequence or an address which is two greater than the previous address.

Stage 13 includes a "zeros" input gate 303 and a "ones" input gate 304. Gate 303 is conditioned by the simultaneous occurrence of positive signals on lead 301 from the P* register and lead 305 from the zero side of the PAC ADD FF. Gate 304 is conditioned by the simultaneous occurrence of positive signals on lead 302 from the P* register and lead 306 from the ones side of the PAC ADD FF. The outputs of 303 and 304 are applied to read-out gate 308 through NOR circuit 307.

The PAC ADD FF is reset at MP1 by a clock pulse applied to the reset input through NOT 309. When reset the PAC ADD FF causes one to be added to the value applied to the counter from P*.

Assume for the moment that P*13 contains a zero and the PAC ADD FF is reset thereby indicating that one is to be added. The binary sum of 0+1=1 so P13 should be set. With both input leads positive gate 303 produces a negative output signal which is inverted at 307 and applied to read-out gate 308. At MP6 the command P*+1 to P passes through NOR 310 to condition the second input of 308. With both inputs conditioned the read-out gate produces a negative signal on lead 201. The signal is applied to the set input of the flip-flop in stage 13 of the P register.

On the other hand, if P*13 contains a one and the PAC ADD FF is reset then P13 should not be set since 1+1=0 with a carry of one. The negative signal on lead 301 blocks gate 303 and the negative signal off the ones side of the PAC ADD FF blocks gate 304. With both gates 303 and 304 blocked NOR 307 produces a negative output signal to block the read-out gate 308.

The PAC ADD FF is set in order to add two to the value applied to the address counter from P*. The command SKIP appearing on lead 311 conditions one input of gate 312. At MP9 a clock pulse appearing on lead 313 causes 312 to produce a negative output signal to set the PAC ADD FF.

When two is being added to the value in P* the low order position does not change. Thus, if P*13 is set P13 should be set and if P*13 is reset then P13 should not be set.

With the PAC ADD FF set the signal on lead 305 blocks gate 303 and the signal on lead 306 conditions one input of gate 304. If P*13 contains a one the second input of 304 is conditioned. The gate produces a negative output signal that is inverted at 307 and applied to read-out gate 308. At MP15 the command *P*+2* conditions the second input of 308 and the resulting negative voltage on lead 201 sets P13.

If P*13 contains a zero then lead 302 is negative to block gate 304. With both gates 303 and 304 blocked the output from 307 blocks the read-out gate to prevent P13 from being set.

There is always a carry from stage 13 if two is being added. In addition, there is a carry from stage 13 if P*13 contains a binary one and either one or two is being added. The Carry Initiate Gate 314 is provided for applying carries from stage 13 to the higher order stages.

The Carry Initiate Gate has one input connected over lead 301 to the reset side of the FF in stage 13 of P* and a second input connected by lead 305 to the reset output of the PAC ADD FF. Therefore, if two is being added lead 305 is negative and if P*13 contains a binary one lead 301 is negative. A negative signal on either one of these leads blocks the Carry Initiate Gate causing it to produce a positive carry signal.

Stages 00 through 12 are similar to each other and like stage 13 each includes a "zeros" input gate 303, a "ones" input gate 304, a NOR circuit 307 and a read-out gate 308. In addition, each of the stages 00 through 12 includes a carry input gate 315 having an output connected to gate 304. The output of 315 is also connected to gate 303 through NOT circuit 316.

In order to increase the speed of carry propagation the address counter is divided into four carry groups. Group I includes stages 10 through 13, Group II includes stages 6 through 9, Group III included stages 2 through 5 and Group IV comprises the two high order stages 00 and 01.

Consider for the moment Group I. Each stage has an input lead 301 connected to the zero side of the flip-flop in the corresponding stage of P*. The signal on lead 301 for stage 12 is inverted at 317 and applied to the higher order carry gates 315 in stages 11 and 10 and the group carry gate 318. The signal on lead 301 for stage 11 is inverted at 319 and applied to the carry gate 315 of stage 10 and the group carry gate 318.

Any carry generated by gate 314 will enter the lowest order stage of the group which can absorb the carry. That is, the carry will enter the lowest order stage in which the input from P* is zero as indicated by a positive signal on the lead 301.

Consider for example the case where P*11 and P*12 contain binary ones and stage 13 of the counter produces a carry through gate 314. P10 should be set and P11 and P12 should not be set by the read-out gates 308.

Gates 303 in stages 11 and 12 are blocked by negative signals on leads 301 from P*11 and P*12. The negative signal on lead 301 from P*12 is inverted at 317 to condition one input of carry input gates 315 in stages 10 and 11. The negative signal on lead 301 from P*11 is inverted at 319 and conditions a second input of the carry gate in stage 10. The carry signal from 314 causes the output from the carry gates in stages 10, 11, and 12 to become negative to thereby block gates 304 in all three stages and condition one input of gates 303.

Since gates 303 of stages 11 and 12 are blocked by the output from P* the read out gates 308 for these stages are not conditioned. However, gate 303 of stage 10 is conditioned by the "zero" output from P*10 so read-out gate 308 of this stage is conditioned when the command *P*+1* or *P*+2* appears.

If P*10 had also contained a binary one then Group I could not absorb the carry. Lead 302 from P*10 blocks gate 304 so that the readout gate of stage 10 is not conditioned. With P*10, 11, and 12 all containing binary ones, Group carry gate 318 produces a Group I carry signal which is inverted at 320 and applied over lead 321 to the carry gates 315 in each higher order stage. In addition, the negative signal on lead 301 from P*10 is inverted at 322 and applied as the Group I carry enable signal over lead 323 to the carry gates 315 and the Group carry gate 318 of the next higher order Group II. Thus, any carry which cannot be absorbed by Group I is applied immediately to Group II. If Group II cannot absorb the carry then its Group carry gate 318 immediately produces a Group II carry signal. This signal appears on the lead 324 in FIGURE 3*a*. Finally, if Groups I, II, and III cannot absorb a carry signal all inputs of the Group III carry gate 318 shown in FIGURE 3*a* are positive and a Group III carry signal is applied to the carry input gates of stages 00 and 01.

The parity generator 6 is shown in FIGURE 4. This circuit continuously determines the parity of the number in the P register. Consider for the moment the gates 100 and 101. If bit 00 of the P register is binary 1 and bit 01 of the P register is binary 0, then gate 100 produces a negative output which is inverted at NOR 102 to produce a positive signal indicating that the number of binary ones in stages P00 and P01 is odd. On the other hand, if bit 00 of the P register is a binary 0 and bit 01 is a binary 1, gate 101 produces a negative output signal which is inverted by NOR 102. Therefore, NOR 102 produces a positive output signal if the number of binary ones in P00 and P01 is odd. In like manner, NOR 103 produces a positive output if the number of binary ones contained in stages P02 and P03 is odd, NOR 104 produces a positive output signal if the number of binary ones in stages P04 and P05 is odd, NOR 105 produces a positive output signal if the number of binary ones in stages P06 and P07 is odd, NOR 106 produces a positive output signal if the number of binary ones in stages P08 and P09 is odd, NOR 107 produces a positive output signal if the number of binary ones in stages P10 and P11 is odd, and NOR 108 produces a positive output signal if the number of binary ones in stages P12 and P13 is odd.

The output of NOR 103 is connected to NOT 109 and gate 110. The output of NOR 104 is connected to NOT 111 and gate 112. If the output of NOR 103 is positive and the output of NOR 104 is negative, gate 110 is conditioned to produce an output signal which is applied to NOR 113. If the output of NOR 103 is negative and the output of NOR 104 is positive then gate 112 is conditioned to produce a negative output signal which is applied to NOR 113. It is obvious therefore that NOR 113 produces a positive output signal if there is an odd number of binary ones in stages P02 through P05.

In like manner, NOR 114 produces a positive output signal if the number of binary ones in stages P06 through P09 is odd and NOR 115 produces a positive output signal if the number of binary ones in stages P10 through P13 is odd.

The output of NOR 114 is connected to NOT 116 and gate 117. The output of NOR 115 is connected to NOT 118 and gate 119. If the output of NOR 114 is positive and the output of NOR 115 is negative, gate 117 is conditioned to produce an output signal which is applied to NOR 120. If the output of NOR 114 is negative and the output of NOR 115 is positive then gate 119 is conditioned to produce a negative output signal which is applied to NOR 120. Therefore, the output of NOR 120 is positive if there is an odd number of binary ones in stages P06 through P13.

In like manner, NOR 121 produces a positive output signal if the number of binary ones in stages P00 through P05 is odd.

The output of NOR 121 is connected to NOT 122 and gate 123. The output of NOR 120 is connected to NOT 124 and gate 125. If the output of NOR 120 is positive and the output of NOR 121 is negative, gate 125 is conditioned to produce an output signal which is applied to NOR 126. If the output of NOR 120 is negative and the output of NOR 121 is positive, gate 123 is conditioned to produce a negative output signal which is applied to NOR 126. Therefore, NOR 126 produces a positive output signal if the number of binary ones contained in stages P00 through P13 is odd and produces a negative output signal if the number of binary ones in stages P00 through P13 is even. Stated differently, NOR 126 produces a positive output signal if the parity of the P register is odd and produces a negative output signal if the parity of the P register is even.

The output signal from the parity generator 6 is applied to the previous parity storage circuit 8 and parity comparison circuit 9 (FIG. 5). If the parity of the P register is odd the positive signal on lead 139 conditions one input of gate 140 and one input of gate 141. If the parity of the address in the P register is even, then the negative signal appearing on lead 139 is inverted at 142 and conditions one input of gate 143 and one input of gate 144. At time MP4, when the contents of the P register are transferred to P*, sequence control element 15 applies the command P to P* to the lead 145 to condition the second input of gates 140 and 143. Since the content of the P register was transferred to the memory address register at MP1 to select the next instruction, it has served its primary purpose and may now be designated the previous instruction address. Therefore, when the previous instruction is transferred to the P* register, the command P to P* is applied to gates 140 and 143 in order to store an indication of the parity of the previous address. If this parity is odd gate 140 is conditioned to reset the Previous Parity Flip-flop. On the other hand, if the parity of the previous address is even, gate 143 is conditioned to set the Previous Parity Flip-flop.

Gates 141 and 144 compare the parity of the present address with the parity of the previous address. It was noted that the parity of the previous address was stored in the Previous Parity Flip-flop at time MP4 which was the time the previous instruction address was transferred to the P* register in preparation for computing the next instruction address. By time MP6 this next instruction has been computed and stored in the P register and an indication of the parity of this address appears on the lead 139. If the parity of the previous address is odd the Previous Parity Flip-flop produces a positive signal on lead 146 to condition one input of gate 141. If the parity of the present address is also odd, the positive signal on lead 139 conditions the second input to 141 thereby causing the gate to produce an output signal which is applied through NOR 147 to gates 136 and 137. The output of NOR 147 is inverted at 148 and applied *to* gates 135 and 138.

If the parity of the previous instruction address is even, the Previous Parity Flip-flop conditions one input of gate 144. If the parity of the present instruction address is even, the negative signal on lead 139 is inverted at 142 and conditions the second input of 144. The output of 144 is also applied through NOR 147 to gates 135 through 138.

It should be noted that if the parity of the previous address is odd and the parity of the present address is odd or if the parity of the previous address is even and the parity of the present address is even, then the signal appearing on lead 149 is positive thereby conditioning the gates 136 and 137. If the parity of the present address is not the same as the parity of the previous address, than the signal appearing on lead 149 is negative and this signal is inverted at 148 to condition one input of gate circuits 135 and 138.

The comparing circuit 12 is also shown in FIGURE 5 and comprises seven gates 127 through 133 corresponding to the seven even order stages of P and P*. Each gate determines whether or not a given stage of the P* register is 0 and the corresponding stage of the P register is 1. Note for example gate 127 which receives the signals P00 and $\overline{P*00}$. If P00 contains a binary 1 and stage P*00 contains a binary 0 then both inputs to 127 are positive. The negative output of 127 is inverted by NOR 134 to produce the positive output signal $\overline{P_n{}^*P_n}$ thereby indicating that at least one pair of corresponding even bits of P* and P are 0 and 1 respectively.

The output signal from comparison circuit 12 is applied to gates 135, 136, 137, and 138 in the error detector 10.

The error detector responds to signals from the comparison circuit 12, the parity comparison circuit 9, and the commands $P*+1$ to P or $P*+2$ to P to indicate that an error has been made in computing the present address.

The ERROR FF 150 produces an error indication at T8 of the cycle in which the present address is computed if the present address should be one greater than the previous address and an error has been made in the computation. On the other hand, the ERROR FF will be set at MP1 of the cycle following the cycle in which the present address is computed if the present address is supposed to be two greater than the previous address and an error has been made in the computation.

If the present address is supposed to be one greater than the previous address sequence control element 15 issues the command $P*+1$ to P at time MP6 to set the Sequential Address Error Check FF. The output from the set side of this flip-flop conditions one input of gate 151. At MP8 a clock pulse is applied to the second input of 151 and if the Sequential Address Error Check FF is set, the positive output from NOT 152 conditions one input of each of the gates 135 and 137. Therefore, gate 135 will set Error FF 150 at MP8 if the Sequential Address Error Check FF is set, the parity of the previous address is not the same as the parity of the present address, and at least one pair of corresponding even bits of P* and P are 0 and 1 respectively. Gate 137 sets the Error FF at MP8 if the Sequential Address Error Check FF is set, the parity of the previous address is the same as the parity of the present address, and no corresponding even bits of P* and P are 0 and 1 respectively.

If the program counter is computing a present address which is two greater than the previous address, then sequence control element 15 issues the command $P*+2$ to P at MP15. This signal sets the $P*+2$ Error Check FF which has an output from the set side connected to gate 153. The Sequential Address Error Check FF is reset by a negative pulse at time MP9 and the output from the reset side of this flip-flop conditions a second input to 153. Therefore, at time MP1 the clock pulse applied to the third input of 153 passes through this circuit, is inverted at 154, and applied to gates 136 and 138.

Gate 136 sets the Error FF at MP1 if the present address should be two greater than the previous address, the parity of the present address is the same as the parity of the previous address, and at least one pair of corresponding even bits of P* and P are 0 and 1 respectively. Gate 138 sets the Error FF at MP1 if the present address should be two greater than the previous address, the parity of the present address is not the same as the parity of the previous address, and no corresponding even bits of P* and P are 0 and 1 respectively.

The output of the Error FF may sound an alarm, stop the computer, or initiate a program of error recovery.

It is obvious that certain modifications may be made by those skilled in the art without departing from the spirit and scope of the invention as described above. For example, checking of a single rank counter may be accomplished if means (dynamic or static) are provided for temporarily storing each number generated by the counter until the next number is generated.

Furthermore, the present invention is not limited to use in checking the program counter of a data processing device but may be used to check any binary counter whether the counter counts by ones, by twos or by ones and twos selectively. It is intended therefore to be limited only by the scope of the appended claims.

I claim:

1. The combination comprising: means for generating a series of control signals; a binary counter for generating a series of numbers in response to said series of control signals; parity generating means for generating the parity of each of said numbers; storage means for storing each number of said series and its parity until after the next number of said series has been generated; comparing means for comparing each number of said series and its parity with the next number of said series and its parity; and means responsive to said comparing means and said series of control signals for indicating that said counter has not responded correctly to one of said control signals.

2. The combination as claimed in claim 1 wherein said counter includes means responsive to each of said control signals applied to said counter for causing it to generate a number which is one greater than the number generated in response to the preceding control signal.

3. The combination as claimed in claim 1 wherein said counter includes means responsive to at least one of said control signals applied to said counter for causing it to generate a number which is two greater than the number generated in response to the preceding control signal.

4. The combination comprising: first means for storing a first binary number and its parity; arithmetic means responsive to said first storage means and a control signal for generating a second binary number and its parity; comparing means for comparing said first number and its parity with said second number and its parity; and means responsive to said comparing means and said control signal for indicating that said second number is not the number which should have been generated by said arithmetic means in response to said control signal.

5. In a binary counter of the type having first and second number storage registers and an arithmetic element operative in each of a plurality of cycles to add one to the content of said first register and enter the result in said second register, the improvement comprising: means for generating the parity of the number in said second register; means for transferring the number in said second register to said first register; means for storing the parity of the number transferred to said first register; means for comparing the parity of the number in said first register with the parity of the next number entered into said second register by said arithmetic element; means for comparing the next number in said second register with the number in said first register; and means responsive to said parity comparing means and said number comparing means for indicating that the number in said second register is not greater than the number in said first register by a value of one.

6. The combination comprising: means for storing a first number and its parity; means responsive to said storage means for adding one to said first number to obtain a resultant number; means for generating the parity of said resultant number; means for comparing the parities of said numbers; means for comparing said numbers; and means responsive to said parity comparing means and said number comparing means for indicating that said resultant number is not one greater than said first number.

7. The combination comprising: storage means for storing a binary operand and its parity; control signal generating means; binary arithmetic means responsive to said binary operand and said control signal generating means for producing a resultant number; parity generating means responsive to said arithmetic means for generating the parity of said resultant number; number comparing means connected to said operand storage means and said arithmetic means for comparing said resultant number with said operand; parity comparing means responsive to said storage means and said arithmetic means for comparing the parity of said operand with the parity of said resultant number; and error indicating means responsive to said number comparing means, said parity comparing means, and said control signal generating means for indicating that said resultant number is not the correct result.

8. The combination as claimed in claim 7 wherein said control signal generating means includes means for selectively producing signals of a first type or a second type, and said arithmetic means includes means responsive to signals of said first type for producing a resultant number that is one greater than said operand and responsive to signals of said second type for producing a resultant number that is two greater than said operand.

9. The combination as claimed in claim 8 wherein said number comparing means comprises means for comparing only the even order digits in said operand with the even order digits in said resultant number.

10. The combination as claimed in claim 9 and including means operative subsequent to the operation of said number comparing means and said parity comparing means for transferring said resultant number and its parity into said storage means whereby each resultant number subsequently becomes the next operand.

11. The combination as claimed in claim 10 wherein said binary arithmetic means comprises a counter responsive to said control signal generating means and said storage means for producing said resultant number and means for storing said resultant number, said parity generating means and said number comparing means being connected to said resultant storage means.

12. The combination as claimed in claim 11 wherein said parity storage means and said parity comparing means are both responsive to said parity generating means and wherein said transfer means includes gating means for storing the output signal from said parity generating means in said parity storage means as said resultant number is stored in said operand storage means.

13. In a binary system for generating a sequence of numbers each number differing from the preceding number by a value of one, the improvement comprising means for checking the operation of said binary system, said checking means comprising; means for generating the parity of each number generated; means for storing each number generated and its parity until the next succeeding number and its parity are generated; means for comparing the parity of each number generated with the parity of the next number generated; means for comparing the even ordered digits of each number generated with the even ordered digits of the next number generated; and error indicating means responsive to said parity comparing means and said number comparing means for indicating that one number in said sequence of numbers is not greater than the preceding number in said sequence by a value of one.

14. The improvement as claimed in claim 13 wherein said number comparing means comprises means for comparing only the even ordered digits of each number in said sequence with the complement of the corresponding even ordered digits in the preceding number in said sequence.

15. The improvement as claimed in claim 14 wherein said error indicating means includes first means responsive to a signal from said parity comparing means indicating that said parities are equal and a signal from said number comparing means indicating that each even ordered digit of the number generated is the same as the corresponding even ordered digit of the preceding number for indicating an error.

16. The improvement as claimed in claim 15 wherein said error indicating means includes second means responsive to a signal from said parity comparing means indicating that said parities are not equal and a signal from said number comparing means indicating that at least one even order digit of the number generated is the complement of the corresponding even order digit of the preceding number for indicating an error.

17. Checking means for checking the operation of a binary device of the type wherein a counter generates a sequence of numbers and wherein said counter generates the next number in said sequence in response to a control signal of a first type or a second type applied thereto by a control means, said checking means comprising; means for generating the parity of each number of said sequence; means for storing each number of said sequence and its parity at least until the next number of said sequence and its parity have been generated; means for comparing the parity of each number in said sequence with the parity of the next number in said sequence; means for comparing each even ordered digit of each number in said sequence with the corresponding even ordered digit of the next number in said sequence; and error indicating means responsive to said parity comparing means, said number comparing means, and said control means, for indicating that said next number generated by said counter is not correct.

18. Checking means as claimed in claim 17 wherein said counter normally responds to control signals of said first type to produce as the next number in said sequence a number which differs by one from the preceding number of said sequence, and responds to control signals of said second type to produce as the next number in said sequence a number which differs by two from the preceding number of said sequence.

19. Checking means as claimed in claim 18 wherein said error indicating means includes first circuit means responsive to a signal from said parity comparing means indicating that said parities are equal, a signal from said number comparing means indicating that at least one pair of digits in corresponding even orders of said numbers are unlike, and a control signal of said second type, for indicating that said next number does not differ from the preceding number of said sequence by a value of two.

20. Checking means as claimed in claim 19 wherein said error indicating means includes second circuit means responsive to a signal from said parity comparing means indicating that said parities are equal, a signal from said number comparing means indicating that each pair of digits in corresponding even orders of the compared numbers are equal, and a control signal of said first type, for indicating that said next number does not differ from the preceding number of said sequence by a value of one.

21. Checking means as claimed in claim 20 wherein said error indicating means includes third circuit means responsive to a signal from said parity comparing means indicating that said parities are not equal, a signal from said number comparing means indicating that at least one pair of digits in corresponding even orders of said numbers are unlike, and a control signal of said first type, for indicating that said next number does not differ from the preceding number by a value of one.

22. Checking means as claimed in claim 21 wherein said error indicating means includes fourth circuit means responsive to a signal from said parity comparing means indicating said parities are not equal, a signal from said number comparing means indicating that each pair of digits in corresponding even orders of the compared numbers are equal, and a control signal of said second type, for indicating that said next number does not differ from the preceding number of said sequence by a value of two.

23. A program counter comprising: previous address storage means; previous address parity storage means; a source of command signals; a binary counter responsive to one of said command signals for selectively adding one or two to said previous address to obtain a present address; means for storing said present address; parity generating means for generating the parity of said present address; means for comparing the parity of said previous address with the parity of said present address; means for comparing the even order digits of said previous address with the even order digits of said present address; and means responsive said parity comparing means, said number comparing means, and said command signal, for indicating that said present address is not the correct address which said counter should have produced.

24. A program counter as claimed in claim 23 and further including gating means for entering the parity of said present address into said parity storage means and said present address into said previous address storage means.

25. A binary device operable in $N-1$ repetitive cycles for detecting non-consecutive numbers in a sequence of N numbers, said device comprising: means operable in each cycle for generating signals representing the digits of the Mth and $(M+1)$th numbers of said sequence, M being number of the repetitive cycle being performed; means responsive to said digit representing signals for generating the parities of said Mth and $(M+1)$th numbers; first means for comparing the corresponding even order digits and second means for comparing the parities of said Mth and $(M+1)$th numbers, and means responsive to said first and said second comparing means for indicating that said $(M+1)$th number is not one greater than said Mth number.

26. A binary device as claimed in claim 25 wherein said indicating means includes gating circuit means responsive to a signal from said first comparing means indicating that said parities are not equal and a signal from said second comparing means indicating that at least one pair of the corresponding even order digits of said Mth and $(M+1)$th numbers are unlike for indicating that said $(M+1)$th number is not one greater than said Mth number.

27. A binary device as claimed in claim 26 wherein said indicating means further includes second gating means responsive to a signal from said first comparing means indicating that said parities are equal and a signal from said second comparing means indicating that all of the even order digits of said Mth number are equal to the corresponding even order digits of said $(M+1)$th number for indicating that said $(M+1)$th number is not one greater than said Mth number.

References Cited by the Examiner

UNITED STATES PATENTS

| | | | |
|---|---|---|---|
| 2,634,052 | 4/53 | Bloch | 235—153 |
| 2,919,854 | 1/60 | Singman | 235—153 |
| 3,098,219 | 7/63 | Voigt et al. | 235—153 X |
| 3,098,994 | 7/63 | Brown | 340—146.1 |

MALCOLM A. MORRISON, *Primary Examiner.*

DARYL W. COOK, *Examiner.*